United States Patent [19]

Chlystun

[11] Patent Number: 4,619,797
[45] Date of Patent: Oct. 28, 1986

[54] METHOD FOR PRODUCING A DISPENSING CONTAINER FOR PRESSURIZED FLUIDS

[76] Inventor: Walter K. Chlystun, 327 St. James Dr., Spartanburg, S.C. 29301

[21] Appl. No.: 673,111

[22] Filed: Nov. 19, 1984

Related U.S. Application Data

[62] Division of Ser. No. 131,248, Mar. 17, 1980, Pat. No. 4,529,108.

[51] Int. Cl.⁴ ............. B29C 49/80; B29C 49/00; B29C 51/00
[52] U.S. Cl. .................. 264/40.1; 264/521; 264/534; 264/296; 264/322
[58] Field of Search .............. 264/40.1, 521, 534, 264/296, 322; 425/384, 393, 398

[56] References Cited

U.S. PATENT DOCUMENTS

| | | | |
|---|---|---|---|
| 3,651,202 | 3/1972 | Raabe | 264/296 X |
| 3,733,309 | 5/1973 | Wyeth et al. | 264/534 X |
| 3,949,033 | 4/1976 | Uhlig | 264/296 X |
| 3,949,034 | 4/1976 | Uhlig | 264/296 X |
| 4,035,455 | 7/1977 | Rosenkranz et al. | 264/296 X |
| 4,086,315 | 4/1978 | Piotrowski | 264/296 X |

Primary Examiner—Jan Silbaugh
Attorney, Agent, or Firm—Dority & Manning

[57] ABSTRACT

A molded, thermoplastic container having a pressure dome section in an end wall to permit the container to hold pressurized fluids. An integral dispensing spout may be provided which preferably is collapsible to nest within the container, and having sanitary seal means over the spout. An annular ring structure around the pressure dome section may be provided to permit the container to stand on an end during filling and storage. Method and apparatus are included for forming the pressure dome section in a previously molded thermoplastic end wall, for collapsing a dispensing spout to a nested position within the container, and for pressure testing the container.

10 Claims, 14 Drawing Figures

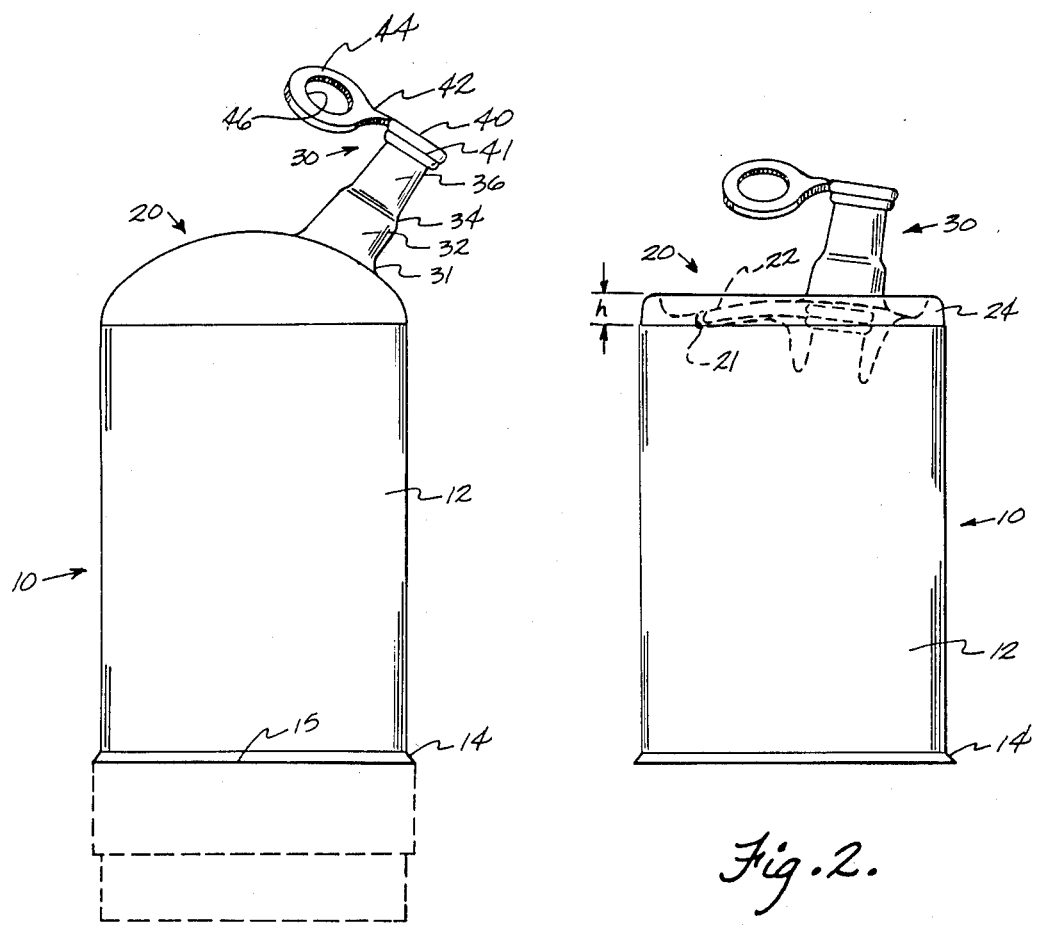
Fig. 1.
Fig. 2.
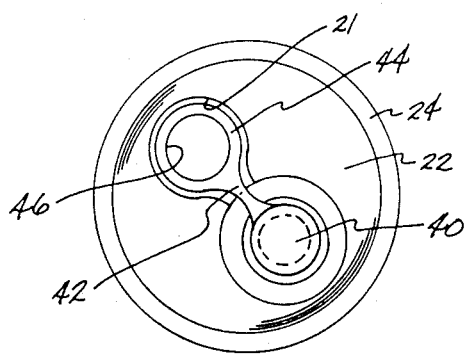
Fig. 3.

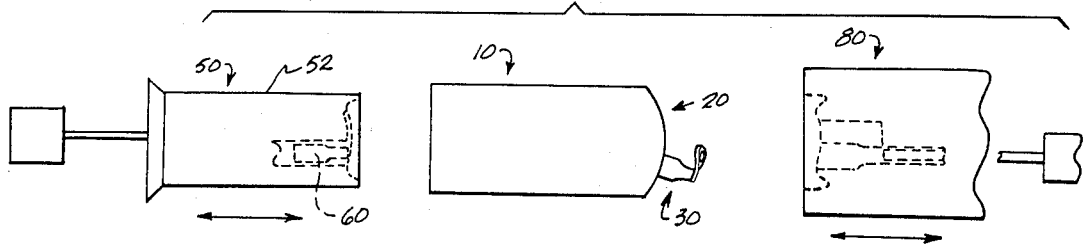
Fig. 4.a
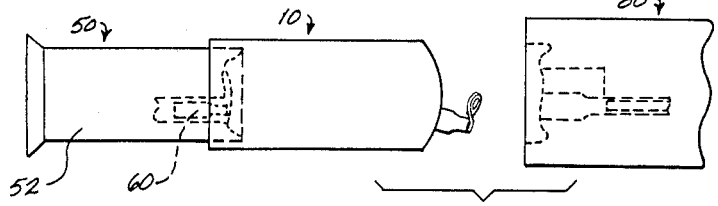
Fig. 4.b
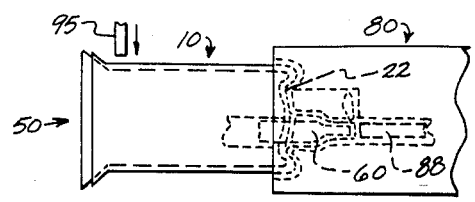
Fig. 4.c
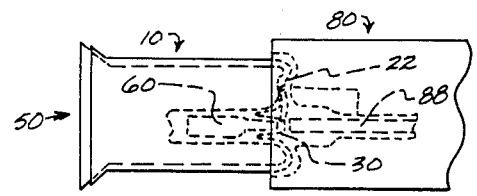
Fig. 4.d
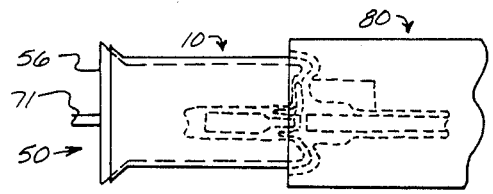
Fig. 4.e
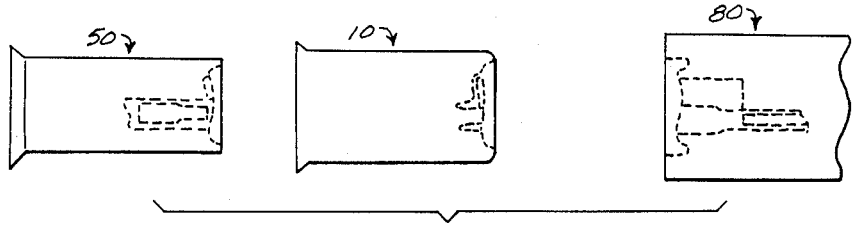
Fig. 4.f

METHOD FOR PRODUCING A DISPENSING CONTAINER FOR PRESSURIZED FLUIDS

This is a division of application Ser. No. 06/131,248, filed Mar. 17, 1980, now U.S. Pat. No. 4,529,108.

BACKGROUND OF THE INVENTION

Containers have heretofore been produced that are capable of containing pressurized fluids without adversely affecting the container. Such containers generally having historically been manufactured from materials capable of withstanding the internal pressures of the container without bulging of side walls, rupture or the like, such as various metals and glass. Containers for carbonated beverages, for example, have generally been produced from glass, the structural and physical characteristics of which were adequate to contain the carbonated beverages without distortion or rupture of walls of the container. Recently, containers have been blow molded from thermoplastic polymeric materials which likewise are capable of containing carbonated beverages or other pressurized fluids without distortion or rupture of the container walls. These more recent containers have been blow molded from polyester resins or the like with a domed pressure structure at a lower end of same, opposite an end having a conventional capped neck through which the containers are filled and the contents dispensed. In view of the hemispherical domed structure it has been necessary to further modify the container for stacking, etc. One type of molded container for pressurized fluids has a cylindrical flat bottomed base adhesively secured around the hemispherical pressure dome to provide improved impact resistance as well as a flat bottom for display and utilization of the container in a vertically oriented position. A further molded container of the type mentioned above has a plurality of supporting feet molded around the bottom pressure dome section, which feet likewise enable the domed container to be disposed in a vertically oriented position.

The present invention represents yet another approach to dispensing containers in general, with particular ability of the container to hold carbonated beverages and other pressurized fluids. Additionally the container may include a molded pouring spout and the spout may be capable of being nested within the container prior to dispensing. Such spouts may be utilized for pouring from the container, or for individual consumption of the fluid from the container. Containers of the present invention furthermore are capable of being maintained in a sterilized condition insofar as the dispensing spout is concerned, a feature which is not generally available for presently existing containers as described above. The present invention further relates to a method and apparatus for producing containers of the present invention to render same capable of withstanding internal pressures of pressurized fluids, while further permitting more efficient filling procedures to be utilized with the container.

While applicant has a number of patents directed to containers having nestable dispensing spouts and to a method for producing same, the subject matter of the present invention is not believed to be anticipated or suggested thereby. Such patents include U.S. Nos. 3,298,577; 3,690,522; 3,856,187; D240,314; 4,027,811; 4,082,827; 4,066,190; 4,095,728; and 4,139,129, the subject matter of which is incorporated by reference herein as to particular types of spout arrangements for containers that are the subject matter of the present invention. No further prior art is known by applicant which is believed to anticipate or suggest the subject matter of the present invention.

SUMMARY OF THE INVENTION

It is an object of the present invention to provide an improved dispensing container that is molded from a thermoplastic polymeric material and which is capable of containing pressurized fluids therein.

Another object of the present invention is to provide an improved molded dispensing container which has a nestable dispensing spout in a top wall of same and which container is capable of withstanding pressures exerted internally thereof by pressurized fluids, with the further capability of maintaining the dispensing spout in a sterilized condition subsequent to manufacture and up to the point of consumption of the contents of the container.

Still another object of the present invention is to provide an improved dispensing container that has been molded from a thermoplastic polymeric material, which container after molding is reformed to provide a pressure dome in an end wall of same, and which container may be filled through an open end of same followed by closure of the container with a separate end cap, said container being capable of standing flat on an end for filling and further handling and placement.

Another object of the present invention is to provide a molded container end wall with a pressure dome section therein, whereby a container utilizing said container end wall will be capable of containing pressurized fluids therein.

Yet another object of the present invention is to provide a method of reforming a molded container end wall to afford a container utilizing same with a capability of holding pressurized fluids therein.

It is still a further object of the present invention to provide an improved method of manufacturing a molded container of thermoplastic polymeric material which container has a dispensing spout in an end of same, which end is further provided with a pressure dome section to permit the container to contain pressurized fluids therein.

Yet another object of the present invention is to provide a method of reforming a molded container having a nestable dispensing spout therein, to render the container capable of withstanding internal pressures of a pressurized fluid contained therein.

Still further another object of the present invention is to provide an improved method of collapsing a dispensing spout for a molded container to a nested position within the container.

Another object of the present invention is to provide apparatus for forming a pressure dome section in a molded end wall for a container, for collapsing a nestable dispensing spout of a molded container, and/or for pressure testing of a container.

Generally speaking, the container of the present invention is molded from a thermoplastic polymer material normally by blow molding or injection molding techniques, and comprises at least one side wall; a top wall secured to said at least one side wall, said top wall having a pressure dome section formed therein; and a dispensing a spout secured to said top wall, said dispensing spout comprising a lower flexible section and an upper section, said upper section having a smaller dimension than said lower section, said lower section being evertible into said container and said upper section being collapsible into said lower section whereby said spout is nestable within said container; a cover integral with said spout at an upper end thereof; and a spout withdrawal means integral with said cover and extending outwardly therefrom, said withdrawal means having gripping means adjacent an outer free end of same, said container being capable of containing pressurized fluids therein.

A further container according to the teachings of the present invention would include a dispensing spout that is not nestable within the container where likewise, a pressure dome section is provided in a top wall of the container, normally surrounding the dispensing spout. For both types of containers, the pressure dome section in the upper end of same, is generally defined by an annular ring extending around the periphery of the top of the container with a hemispherical dome emanating from within the annular ring and extending upwardly therefrom, the ring being of sufficient height to extend at least to the top of the higher of the dome and the spout. Wall thickness of the top wall having a pressure dome section therein is generally about twice the thickness of the side walls of the container, whereby pressurized fluids may be maintained within the container without bulging or rupture of the walls of the container.

While in a preferred embodiment, the container of the present invention is blow molded and has an open end to be capped after filling, with the pressure dome being provided in a blow molded end wall, a separate molded end wall for a container may have the pressure dome section therein.

The method for producing a container according to teachings of the present invention, generally includes the steps of providing a molded container top, which preferably includes container side walls of unitary construction therewith, the top having been produced from a thermoplastic polymeric material; locating said molded container top between male and female forming mandrels, said mandrels having complementary die sections thereon defining a pressure dome section; heating the container top adequate to convert the thermoplastic polymeric material from a crystalline to an amorphous state in at least the portions thereof to be reformed; bringing said mandrels into registry, and forming heated top wall portions between said dies into a contour defined by said dies; cooling the container adequate to return the polymeric material to the crystalline state; and withdrawing the mandrels.

Additionally, in performing the method according to the teachings of the present invention, should the container have a nestable dispensing spout in the top wall, the forming mandrels may be provided with male and female portions that controllably collapse the dispensing spout to its nested position within the container side walls, or alternatively the mandrels may collapse the dispensing spout without performing a reforming operation on the container top wall. Likewise, should the molded container include a top wall and side walls, the mandrel that fits within the side walls of the container may be adapted with means to form a seal around the side wall of the container at an open end of same, and with fluid passageways therein, fluid under pressure may be introduced into the sealed container to pressure check same.

Apparatus according to teachings of the present invention generally comprises a first mandrel movable into and out of operational association with a molded top wall for a container, said mandrel having a die section at an end of same, said die section defining a contour to be formed in said molded top wall; a second mandrel movable into and out of operational association with an opposite side of a molded top wall for a container, said second mandrel having a die section at an end of same, said die section defining a contour to be formed in said molded top wall; and means for moving said mandrels.

More specifically the mandrels may additionally or alternatively be provided with means to controllably collapse a dispensing spout to a nested position within the container. Likewise the first mandrel may further be provided with means to sealingly engage the container adjacent an open end of same and means to introduce pressurized fluid into the container or to create a negative pressure within the container to pressure test the container. In a most preferred embodiment, a first mandrel is adapted to be received within an open end of the molded container, and the second of said mandrels is adapted to reside against an outside of a closed end of the molded container to cooperate with the first mandrel to reform the molded top of same. The two mandrels have complementary die sections at the ends of same, along with heating means to heat at least the container top wall portion to be formed adequate to convert the polymeric material from a crystalline state to an amorphous state. Additionally, for a molded container having a nestable spout in the top wall, the first mandrel which is receivable within the container is provided with an axially extending passageway in which a guide element is received. The guide element is spring biased in an outward direction where the guide element protrudes beyond the face of the die section. Releasable locking means are provided along the guide element within the mandrel.

The second mandrel is provided with a spout receiving opening in its face, shaped to reside around the outer side of the extended spout with movable means associated therewith to contact an upper end of the spout and collapse same to its nested position. As the respective mandrels move together to a forming position, the extended spout is supported internally and externally by the guide element and spout receiving opening respectively, and is thus controllably forced into its collapsed, nested position within the container by the second mandrel and the movable means located thereon. The guide element of the first mandrel is returned to its locked position within the mandrel during collapse of the spout. In the most preferred embodiment, the first mandrel further is provided with means to make sealing engagement with an inside of the side wall of the container adjacent the open end of same, and with means to then admit fluid under pressure within the sealed container or to evacuate the container to pressure test same.

BRIEF DESCRIPTION OF THE DRAWINGS

FIG. 1 is a side elevational view of a container according to teachings of the present invention after molding and before forming.

FIG. 2 is a side elevational view of the container of FIG. 1 after forming, but with the spout extended, the spout being shown in phantom lines in a nested position within the container.

FIG. 3 is a top view of a container according to the present invention after forming, and with the spout nested.

FIGS. 4(a-f) are schematic illustrations of method steps of reforming a container top wall, controllably collapsing a nestable dispensing spout, and pressure testing a container.

DESCRIPTION OF THE PREFERRED EMBODIMENTS

Figure 5:
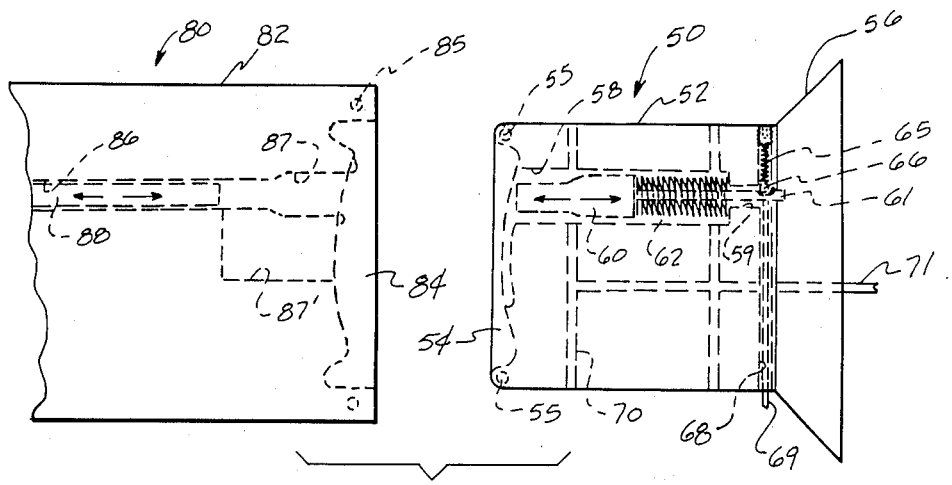
FIG. 5 is a partial side view of forming mandrels according to the present invention, illustrating details of same.
Figure 6:
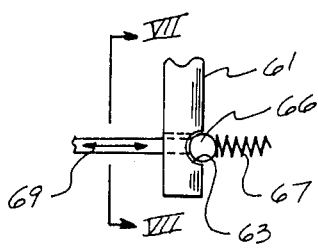
FIG. 6 is a partial enlarged side view of the guide element locking means of a mandrel according to the present invention.

Referring to the Figures, specific embodiments of the present invention will now be described in detail. In FIG. 1, there is shown a preferred type of container according to teachings of the present invention subsequent to blow molding of same and prior to a forming process to produce a pressure dome in a top wall thereof. The container generally indicated as 10 has a cylindrical side wall 12, a bottom lip 14 which, after filling of the container, will be utilized to secure a bottom lid for closing of the container. Container 10 further has a top wall generally 20 with a bulged appearance and a dispensing spout generally indicated as 30 of unitary construction therewith.

Dispensing spout 30, as mentioned hereinbefore, may take numerous forms of the type set forth in the previously recited Chlystun patents. For purposes of the present invention, however, the spout is generally shown to have a lower first section 32 that extends upwardly from a radiused portion 31 adjacent top wall 20 to an intermediate radius 34 above which is located a smaller dimensioned section 36. With radii 31 and 34 and the particular dimensional relationships of spout sections 32 and 36, spout 30 can be collapsed into a nested position within the container side wall 12 as shown in phantom in FIG. 2 where upper small dimensioned section 36 resides within everted lower section 32. A cover member 40 is secured at an outer end of upper spout section 36, and in the sense of the blow molded container is of unitary or integral construction therewith. A weakened wall section 41 is provided at the juncture between spout section 36 and cover member 40 to permit the removal of cover 40 from an end of spout 30 for dispensing of the contents of the container. Depending upon the design and configuration of an upper end of spout 36 with respect to cover 40, the dispensing spout, if desired, may be provided with reclosing and/or resealing features, such that, after removal of cover 40 from spout 30, cover 40 can then be replaced thereover in a reclosing or resealing engagement.

Cover 40 has a spout withdrawal means 42 extending outwardly therefrom and terminating as a gripping member 44 which preferably has a finger receiving opening 46 therethrough. With the spout in the nested position, withdrawal means 42 and gripping means 44 reside generally flush with the top wall 20 of container 10 or, as shown, in a molded recess 21 therefor. Shown in phantom below sealing lip 14 is a further portion of container 10 as same appears upon leaving the blow molding machine. The material in phantom is trimmed from the overall container 10 generally along a line 15 at the base of lip 14 to define an open end of container 10 for the purposes of subsequent formation of the pressure dome section in the top wall generally 20, collapse of spout 30 and the filling and closing of the container.

As shown in FIGS. 2 and 3, the container has now been reformed to change the configuration of the bulged top wall 20 to provide a pressure dome 22 that is generally convex as illustrated, though could be concave, with a peripheral ring 24 surrounding same. Ring 24 may extend completely around top wall 20, or may be segmented into a plurality of arcuate or similar sections. Generally speaking, to ensure that container 10 will withstand internal pressures from a pressurized fluid contained therein, the thickness of top wall 20 with pressure dome 22 should be generally twice the thickness of side wall 12. Moreover, it is important in the handling of container 10, particularly on existing filling equipment, that the top of container 10, which would be inverted during filling to reside on a particular surface, rest securely on the surface in a stable fashion. As such, the height of annular ring 24 as indicated by h on FIG. 2, should extend at least as high as the outer terminal end of pressure dome section 22, or spout cover 40 when nested.

As illustrated in FIG. 3, with the spout 30 in a nested position, withdrawal means 42 and gripping means 44 reside within a nolded recess 21, all of which appear at a level coincident with the top of annular ring 24 or lower for the purposes described above.

Making particular reference to FIGS. 4-7, the method and apparatus for subsequent formation of the pressure dome section in the molded container, collapse of the dispensing spout, and pressure testing of the container will be described. FIGS. 4(a-f) generally depict method steps of accomplishing the above noted procedures, utilizing schematic illustration of a container 10, and forming mandrels 50 and 80. A first or female mandrel 50 is provided to be received within the container side wall 12, or against the underside of a container top if same is utilized without side walls. A second or male mandrel 80 is designed to be received against the outside of the container top wall or container top. FIGS. 4(a-f) thus illustrate the particular sequencing of formation of the pressure dome on the container 10, as well as other operations that may be performed simultaneously therewith or sequentially therewith, depending upon the particular set of circumstances. For a complete understanding of same, however, references is first made to FIGS. 5-7 for a more detailed description of the forming mandrels 50 and 80.

Depending upon the dictates of the ultimate container, female mandrel 50 and male mandrel 80 may be provided to perform one or several operations as noted above. As such, both mandrels are illustrated with means to perform all of the operations with the understanding that only means for performing one or more of the operations may be so provided. In a preferred arrangement, all three capabilities are provided on the male and female mandrels, such that, collapse of the spout, formation of the pressure dome, and pressure testing of the container may be performed in a generally simultaneous or sequential operation.

In FIG. 5, the first or female mandrel is generally indicated as 50. A mandrel body 52 is provided having a general configuration of the inside of a container in which it is to be loosely received. Mandrel body 52 is provided with a die configuration 54 at a forward end of said to define the undersurface of the pressure dome 22 when formed in top wall 20. In formation of the pressure dome section in the previously molded container top wall, it is necessary to heat at least the portions of the top wall to be reformed. Female mandrel 50 may thus be provided with heating means 55, which could take the form of a resistance heating coil, whereby an underside of the top wall 20 of a container may be heated thereby adequate to convert the crystalline synthetic polymeric material to an amorphous form. A rear end of female mandrel 50 is provided with an enlarged resilient portion 56 that is designed to make sealing engagement with container 10 around the rear open portion thereof to permit pressure testing of the container, if desired. Internally of female mandrel 50 and extending generally axially with respect to the length of same, is a large diameter passageway 58 that reduces to a small diameter passageway 59 towards the rear end of mandrel 50. Received within passageway 58 is a guide element 60 that generally assumes the internal configuration of a dispensing spout to be everted. Secured to guide element 60 and extending rearwardly therefrom along passageways 58 and 59 is a lockable guide rod element 61 which has an arcuate detent section 63 adjacent a rearward end thereof and a slot 64 disposed 90° to detent 63 (See FIGS. 6 and 7), the purpose of which will be described hereinafter.

Figure 7:
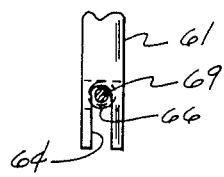
FIG. 7 is a view of the locking means of FIG. 6, taken in a direction according to a line VII—VII.

As illustrated in FIG. 5, guide element 60 is locked within the confines of female mandrel 50 under spring tension provided by a coil spring 62 located between the end of large diameter passageway 58 and a rear side of guide element 60. A releasable locking means, illustrated by a spherical element 66 is received within a passageway 65 in mandrel body 52 where it is held under tension by a spring 67 located therebehind. When guide element 60 is depressed within passageway 58, guide rod 61 moves rearwardly of mandrel 50 to a point where spherical element 66 moves within the detent 63, and locks guide element 60 within mandrel 50. A release rod 69 is received in a passageway 68 in body 52 opposite spherical element 66. One end of rod 69 resides immediately adjacent spherical element 66, in slot 64 of guide rod 61 (FIG. 7). An opposite outer end of rod 69 is located beyond the outer periphery of mandrel body 52, whereby when desired, pressure may be applied against the outer free end of rod 69 to force spherical element 66 out of detent 63 and thus release guide element 60 to move forward to a position where the majority of guide body 60 extends beyond the die 54 of female mandrel 50 where it will enter an extended spout 30 to guide same during its collapse to a nested position. Female mandrel 50 is further provided with an air passageway 70 that communicates with an air supply or evacuation means 71 and the interior of a container 10 to permit pressure testing of the container as mentioned above.

Second or male mandrel 80 includes a mandrel body 82 having a die portion 84 at an outer end of same, with die portion 84 being the complement to the die portion 54 of female mandrel 50. In like fashion to female mandrel 50, male mandrel 80 may include heating means 85 disposed adjacent die 84 to provide heating of the container portion to be reformed. Male mandrel 80 is further provided with a passageway 86 extending axially with respect to the length of same, extending into spout receiving recesses 87 and 87'. A plunger 88 is received within axial passageway 86 and is movable into spout receiving recess 87 to contact an upper portion of a confined spout and force same into a controlled collapse to a nested position within container 10. In operation, mandrel 80 is so dimensioned to first engage a spout 30 adjacent radii 31 and 34 to ensure proper initiation of eversion and collapse of the spout as generally illustrated in FIG. 2.

Referring now to FIGS. 4(a-f), the general sequence of operations will be described. The specific apparatus for performing the overall operations may vary depending upon the degree of automation desired as well as the speed of operation dictated by the overall process line.

In FIG. 4a, a container 10 is illustrated having a bulged top wall 20 and an extended dispensing spout 30. Female mandrel 50 and male mandrel 80 are both illustrated out of contact with container 10 and are provided with means to move same back and forth into and out of contact with container 10. Means for movement of mandrels 50 and 80 have been schematically illustrated in FIG. 4a, but are not set forth in the remaining sections of FIG. 4 for the sake of clarity, though same would be included during each process step. Such movement means could include air cylinders, hydraulic cylinders, cam-follower arrangements, or the like. Further, pressurized fluid supply and a power source for the heating means could be provided in conjunction with the movement means or separate therefrom. Additionally, one of the mandrels could be stationary, with only the other mandrel move into and out of contact with the container.

In FIG. 4b, mandrels 50 and 80 have moved inwardly with respect to container 10, being so moved by their respective movement means to a point where female mandrel 50 begins to extend within the body of container 10. Guide element 60 is shown as residing within body 52 of female mandrel 50.

In FIG. 4c, mandrels 50 and 80 are illustrated in full contact with opposite sides of top wall 20. An actuator 95 is illustrated ajacent side wall 2 of container 10, which has engaged side wall 12 and depressed release rod 69 against spherical element 66 and released guide element 60 from its locked position. Guide element 60 has moved outwardly into the spout 30 of container 10. Reference is made to the particular angular disposition of spout 30 with respect to guide element 60. As guide element 60 enters the interior of spout 30, the spout is forced from its angle as formed to a generally straightened condition. Such is permitted by virtue of flexibility of the spout, with the deflection generally occurring along radius 31 adjacent the top wall 20. The heating elements within the respective mandrels have applied heat to the affected portions of top wall 20 as the mandrels approach same, whereby the synthetic polymeric material converts from a crystalline to an amorphous state, and the top wall as trapped between the dies 54 and 84 of mandrels 50 and 80, is reformed to the shape of the dies. Obviously also, as male mandrel 80 moves into contact with top wall 20, spout 30 and the withdrawal means associated therewith are received within the appropriately formed recesses 87 and 87' of mandrel 80, with the plunger 88 either being moved upwardly by contact with the cover 40 of spout 30, or being so positioned as to be received immediately above cover 40 when the mandrels come into registry. As mentioned hereinbefore actual initiation of collapse of spout 30 begins before dies 54 and 84 come into registry.

Referring to FIG. 4d, after formation of the pressure dome section 22 in the top 20 of container 10, and while container 10 is still heated, plunger 88 of mandrel 80 is actuated to move against spout 30 and continue the collapse of same. As plunger 88 moves forward, spout section 36 being within the confines of cavity 87 of mandrel 80 and being internally supported by guide element 60 begins to move downwardly around radius 34 while base spout section 32 continues to evert around radius 31 to ultimately reside internally of the everted section 32. During spout collapse, guide element 60 is forced rearwardly against the tension of spring 62 to its original position within female mandrel 50. When spherical element 66 moves within detent 63, the guide element 60 will again be locked in position. At this point, the top wall of the container has been reformed to define the pressure dome section therein and the spout has been everted to a nesting position within the container body. The container is then allowed to cool or is contacted with a cooling medium, whereby the polymer returns to a crystalline state, retaining the reformed configuration.

In FIG. 4e, with the female mandrel still fully inserted, and forming a sealing engagement between sealing means 56 and an inside surface of side wall 12 adjacent the open end of container 10, air under pressure is admitted via air supply means 71 into the air passageway 70 (FIG. 5) of mandrel 50 to pressure test container 10 and determine the presence of leaks if any. Obviously if a leak is detected, the container is rejected. Likewise as mentioned above, the container can also be pressure tested under negative pressure conditions.

As illustrated in FIG. 4f, following the pressure test step, the mandrels are returned to their original position away from container 10, thus leaving a container that has been tested for leaks, the spout has been everted to its nesting position within the container side walls, and the top wall of the same has been reformed to define a pressure dome section therein. The container is now ready for printings, filling and closing, or the like.

The above recited method of handling containers according to teachings of the present invention may be conducted individually on one container at a time, or automated whereby containers are sequentially supplied to a forming-testing station in proper registration to receive the mandrels. Likewise the station may be associated with the mandrels, such that the station, container and mandrels move as a unit along, a continuous path which would substantially increase the speed of operation of same.

Figure 8:
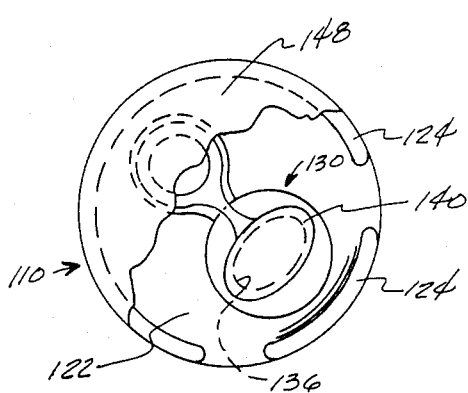
FIG. 8 is a top view of a container according to teachings of the present invention having a seal across the top thereof, the container being shown broken away to illustrate a further spout embodiment.

A further embodiment of the container of the present invention is illustrated in FIG. 8. A container generally indicated as 110 is provided having a pressure dome section 122 in a top wall of same surrounded by ring segments 124 in similar fashion to that shown in FIG. 2. A dispensing spout is provided where the upper section of the spout 136 is formed in a general elliptical shape with a cover 140 thereover having a withdrawal means 142 extending outwardly therefrom and terminating as a gripping means 144 with a finger receiving opening 146 therethrough. The elliptical shape of the upper spout section better conforms to the shape of the human mouth, and thus permits the dispensing spout to be utilized in a more effective fashion for receiving contents for individual consumption where the spout is withdrawn from its nested position within the container, the cover removed, and the elliptical shaped upper spout section 136 received within the consumer's mouth. With such an arrangement, the spout section 136 at least and cover 140 could be sterilized at some part of the process during or subsequent to everting of the spout, after which a sealing means 148 may be applied across the entire upper portion of the container, or at least a portion of the upper container adequate to seal the spout from contamination. Any suitable sealing means 148 may be employed to effectively maintain spout 130 in a sanitary condition, such as metals, e.g., aluminum, paper, plastic, and the like. With the spout being sealed against contamination, and the opposite end of the container being open, conventional filling equipment may be utilized to supply contents to the interior of the container after which the bottom wall is applied to close the container. The filled container is then available in a sanitary condition, until such time as seal 148 is broken or removed to expose spout 140.

Figure 9:
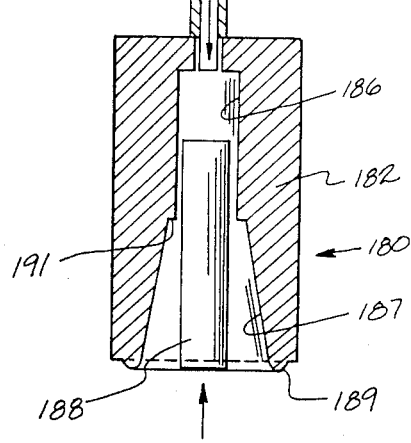
FIG. 9 is a horizontal cross sectional view of a mandrel according to teachings of the present invention illustrating a further embodiment for spout collapsing means.

FIG. 9 illustrates a further embodiment of a male or second mandrel generally 180. Mandrel 180 as shown does not have a die forming section and could be used in conjunction with a female mandrel which likewise would not have a die forming section, though this particular spout everting embodiment could be substituted for that illustrated in FIG. 5, or vice versa. Mandrel 180 has a body 182 in which a spout receiving recess 187 is provided. Spout receiving recess 187 generally follows the contour of a spout to be received therein, and includes an upper axial passageway 186 in which a movable plunger 188 is received. As mandrel 180 becomes positioned above a spout to be everted, mandrel 180 is moved toward the spout by its motive power source 200, which passageway is a two stage fluid cylinder. This first stage of cylinder moves mandrel into initial contact with a spout 30 (FIG. 2). Cover 40 engages a lower end of plunger 188 and moves same upwardly along recess 187 and passageway 186. Radius 189 of mandrel 180 engages radius 31 of spout 30 and begins the eversion of base spout section 32. Virtually simultaneously, shoulder 191 along recess 187 engages radius 34 to start axial collapse of spot section 32. At this point plunger 188 has been moved upwardly along passageway 186 for adequate distance or time that the second stage of cylinder 200 is actuated and cylinder piston 201 acts on plunger 188 to force same against cover 40 of spout 30, initiating downward movement of spout section 36. As these operations jointly continue, spout section 32 is everted around radius 31 and 34 and spout section 36 moves into everted spout section 32 within the container (See FIG. 2). Cover 40, and withdrawal means 42 reside flush with the container top wall or within a recess provided therefor.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. A method of reforming a portion of a container having a molded thermoplastic synthetic polymeric top wall with a pressure dome section and a nestable collapsible spout therein comprising the steps of:
   (a) providing a molded container top of thermoplastic synthetic polymeric material and having a nestable collapsible spout;

(b) locating said molded container top between a pair of male and female forming mandrels, said mandrels having complementary die sections at facing ends of same, said die sections cooperatively defining at least an arcuate dome, said male die section defining a receiving recess for receiving said spout when said spout is extended, and said female die section defining a passageway for receiving said spout when said spout is everted;

(c) heating at least the area of said molded top that is to be reformed adequate to convert said polymeric material thereat to an amorphous state;

(d) bringing said male and female mandrels into registry at opposite sides of said top while receiving said spout in said receiving recess in said male die section and entrapping at least the portion of the top to be reformed between said male and female mandrels and causing said entrapped portion of said top to reform to the arcuate dome shape defined by said complementary die sections while said polymeric material is in the amorphous state;

(e) cooling said reformed top section adequate to return the polymeric material to a crystalline state; and (f) withdrawing said mandrels from registry.

2. The method as defined in claim 1 wherein the complementary die sections define an annular ring around the periphery of said top with an arcuately domed section therewithin.

3. The method as defined in claim 2 wherein the top is of integral construction with at least one container side wall.

4. The method as defined in claim 1 wherein the die sections of the mandrels are heated.

5. The method as defined in claim 1 wherein cooling means are provided with said mandrels and said top is cooled by actuating said mandrel cooling means.

6. A method of reforming a portion of a container having a molded thermoplastic synthetic polymeric top wall with a pressure dome section and a nestable collapsible spout therein comprising the steps of:
(a) providing a molded container top of thermoplastic synthetic polymeric material and having a nestable collapsible spout;
(b) locating said molded container top between a pair of male and female forming mandrels, said mandrels having complementary die sections at facing ends of same, said die sections cooperatively defining at least an arcuate dome, said male die section defining a receiving recess for receiving said spout when said spout is extended, and said female die section defining a passageway for receiving said spout when said spout is everted;
(c) heating at least the area of said molded top that is to be reformed adequate to convert said polymeric material thereat to an amorphous state;
(d) bringing said male and female mandrels into registry at opposite sides of said top and entrapping at least the portion of the top to be reformed therebetween and causing said entrapped portion of said top to reform to the shape defined by said complementary die sections while said polymeric material is in the amorphous state;
(e) cooling said reformed top section adequate to return the polymeric material to a crystalline state;

(f) withdrawing said mandrels from registry; and
wherein the top is of integral construction with a container side wall defining a container body, and wherein a portion of said female mandrel enters said container body and a portion of said female mandrel forms a seal with said container body at an end of same opposite said top, and wherein said portion of said female mandrel entering said container body has pressurizing means, and wherein subsequent to reforming said top and at least partial cooling of same, said pressurizing means is actuated and said sealed container body and top are pressure tested for leaks.

7. A method of reforming a portion of a container having a molded thermoplastic synthetic polymeric top wall with a pressure dome section and a nestable collapsible spout therein comprising the steps of:
(a) providing a molded container top of thermoplastic synthetic polymeric material and having a nestable collapsible spout;
(b) locating said molded container top between a pair of male and female forming mandrels, said mandrels having complementary die sections at facing ends of same, said die sections cooperatively defining at least an arcuate dome, said male die section defining a receiving recess for receiving said spout when said spout is extended, and said female die section defining a passageway for receiving said spout when said spout is everted;
(c) heating at least the area of said molded top that is to be reformed adequate to convert said polymeric material thereat to an amorphous state;
(d) bringing said male and female mandrels into registry at opposite sides of said top and entrapping at least the portion of the top to be reformed therebetween and causing said entrapped portion of said top to reform to the shape defined by said complementary die sections while said polymeric material is in the amorphous state;
(e) cooling said reformed top section adequate to return the polymeric material to a crystalline state;
(f) withdrawing said mandrels from registry; and
wherein said top is of integral construction with a container body and said dispensing spout provided on said top, said spout being collapsible to a nesting position within said container body and wherein said mandrels are provided with cooperative means for collapsing said dispensing spout, said spout being collapsed to a nesting position within said container by said mandrels.

8. The method as defined in claim 7 wherein said female mandrel has a spring loaded guide element that is receivable within said spout and said male mandrel has a spout receiving cavity and movable plunger, whereby during movement of said mandrels, said spout is collapsed in a controlled manner to its nested position.

9. The method as defined in claim 8 wherein during said mandrel movement, said male mandrel spout defining cavity initiates eversion of a bottom section of said spout about the top wall, after which movement of said plunger forces said top section of said spout within the everted bottom section.

10. The method as defined in claim 9 wherein the container top, spout and side wall are blow molded.

* * * * *